No. 761,756. PATENTED JUNE 7, 1904.
T. BRUECK.
PHOTOGRAPHIC SHUTTER.
APPLICATION FILED AUG. 11, 1902.
MODEL. 6 SHEETS—SHEET 6.

Witnesses.
Walter B. Payne.
Elizabeth J. Perry.

Inventor
Theodor Brueck
Frederick S. Church
his Attorney

No. 761,756.

Patented June 7, 1904.

UNITED STATES PATENT OFFICE.

THEODOR BRUECK, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 761,756, dated June 7, 1904.

Application filed August 11, 1902. Serial No. 119,187. (Model.)

*To all whom it may concern:*

Be it known that I, THEODOR BRUECK, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My invention relates to photographic shutters for making time, "bulb," instantaneous, and automatically-timed exposures of various durations, and the present embodiment is shown applied to an iris-diaphragm shutter in which the size of the aperture formed by the leaves or blades may be varied or adjusted as desired, so that not only may the character of the exposure be varied, but the aperture as well, thus enabling the user to control and adapt all the factors necessary to obtain the best results in negative making.

In the accompanying drawings, Fig. 4ª, a detached view of the lever connected to the retarding device. Fig. 7, a plan view of the adjustable cam-plate controlling the operating parts.

Similar reference-numerals in the several figures indicate similar parts.

In carrying out my invention the operating parts of the shutter are contained within a casing 1, preferably circular in form and having at the rear the threaded portion 2 for the application of the lens-casing, or if a single lens is employed for attachment to the front of the camera. The casing is also provided with a front cover 3, having the usual central aperture and the sleeve threaded interiorly for the application of the front lens-tube. Arranged within the casing 1 and secured against a ledge or shoulder therein by means of threaded studs or pillars 4 is a plate or septum 5, upon which the operating parts of the shutter are secured, this plate or septum having a central aperture in line with the lens-center, as usual.

Figures 4, 6:
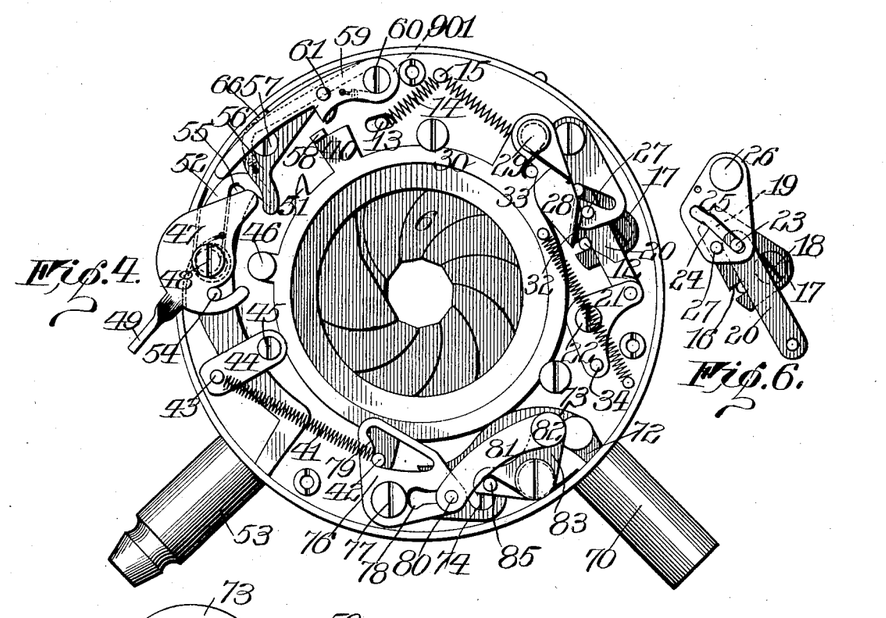
Fig. 4 is a similar view showing the position of the parts during the making of an automatically-timed exposure of longest duration, the shutter being open.
Fig. 6 is a detail of the devices for regulating the size of the aperture of the shutter.
Figures 15, 16, 17:
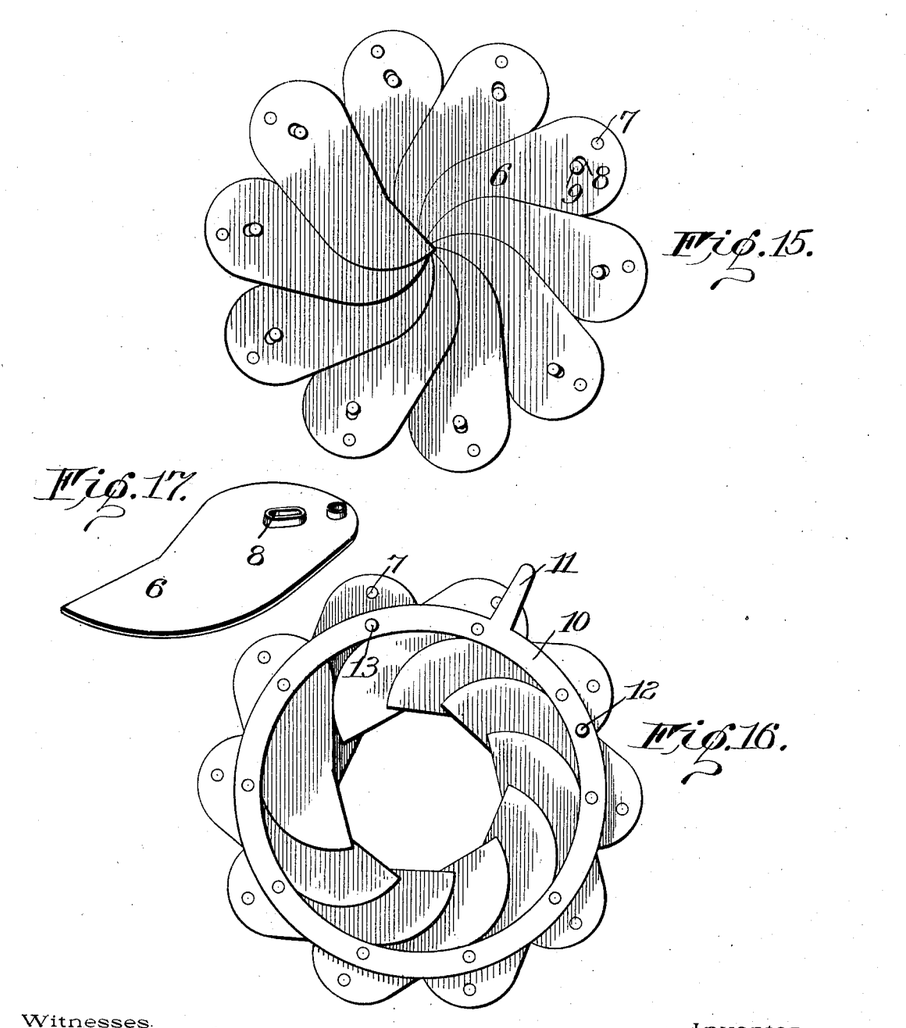
Fig. 15 is a rear elevation of the shutter-blades.
Fig. 16, a front view of the blades and their operating-ring.
Fig. 17, a perspective view of one of the shutter-blades.

The shutter proper to which my present invention is particularly adapted is, as stated, that kind known as an "iris-diaphragm" shutter, embodying separate leaves or blades 6, pivoted to studs 7 at the rear side of the supporting-blade 5 near to the periphery thereof, said blades having one curved and one substantially straight edge and overlapping, as shown in Figs. 15 and 16, in such manner that when turned on their pivots they will close the light-passage and when operated in the opposite direction they will open it, leaving a substantially circular aperture for the passage of light, as shown in Fig. 16. These blades are provided with slots 8, extending substantially radially of the center of the lens, opening when the shutter is closed, as shown in Fig. 15, and adapted for the reception of operating pins or projections 9 at the rear side of the oscillatory ring 10, operating in a suitable annular recess in the rear side of the septum 5. As the shutter-blades are very thin, the metal at the sides of the slots is turned laterally, as shown in Fig. 17, in order to form broad bearing-surfaces, which prevent undue wear of the parts and insure the proper operation. The ring 10 is provided at one side with an arm 11, extending outside of the case, so that the blades may be operated to open the shutter for focusing, if desired, and is also provided at its front side next to the supporting plate or septum with pins 12 and 13, extending through slots in said plate. Said ring 10 is rotated in a direction to hold the shutter-leaves closed by a suitable spring or springs connected to either of the pins 12 or 13, in the present instance a spring 14 being employed, connecting pin 13 with a stationary stud 15 on the face of the plate 5. It will be understood that the rotation of the ring to the left will cause the blades to separate and a return movement to the right will serve to close them. The pin 12 projects into the slot 16 in a lever 17, pivoted at 18 to the plate 5 and having a slot 19 at an angle to the slot 16. (Shown in Figs. 5 and 6.)

20 indicates a link pivoted at one end to a lever 21, that is in turn pivoted to the plate 5 at 22, said link having at its free end a pin 23, engaging in the slot 19 of the lever 17 and also in a slot 24 in a lever 25, pivoted at 26. The pin 23 forms a connection between the levers 25 and 17, which may be adjusted relative to their pivots to vary the leverage between them and also their relative movements. The lever 25 is also provided with the pin or stud 27, with which is arranged to coöperate a pawl 28, pivoted at 29 upon an oscillatory or reciprocatory ring or annular master member 30, having a laterally-extending flange 31, by means of which it is centered for rotation upon the plate 5. (Shown in Fig. 2.) This pawl 28 is provided with a downwardly-projecting operating flange or surface 32, which is inclined relative to the path of rotation of the master member and is normally pressed toward the surface of the said member by a spring 331, the relative arrangement of the pawl and the pin 27 being such that when the master member is in the position shown in Fig. 8 (where it is held by the spring 33) the pin 27 is beneath the flange of the pawl, and when the member is rotated to the left—say to the position in Fig. 9—the pawl will move over the pin without operating it, yielding outwardly for the purpose. When the master member is moved in the opposite direction by its spring 331, the inclined surface of the pawl will engage the pin 27 and turn the lever 25 outwardly and throw the pin 23 and lever 17, operating the ring 10 in a direction to open the shutter blades or leaves, and when the operating edge of the pawl passes beyond the pin 27 the ring will be operated by the spring 14 to close the blades. The employment of the annular oscillatory master member permits the symmetrical arrangement of the parts in the casing and simplicity of construction. As the extent of the movement of the ring 10 determines the size of the opening between the blades, it will be seen that the adjustment of the pin 23 in the slots in the levers determines the amount of movement in the shutter-blades, and the lever 21, controlling this pin, is therefore provided with a projection 34, extending in a cam-slot 35 in an annular plate or ring 36, journaled on the front plate of the casing and held in position by the cover-plate 37, the edge of which latter is provided with the scale 38, with which an index 39, secured to the edge of the plate 36, coöperates, so that by adjusting said plate 36 the extent of the aperture formed by the blades may be regulated as desired.

Figures 1, 2, 3, 5:
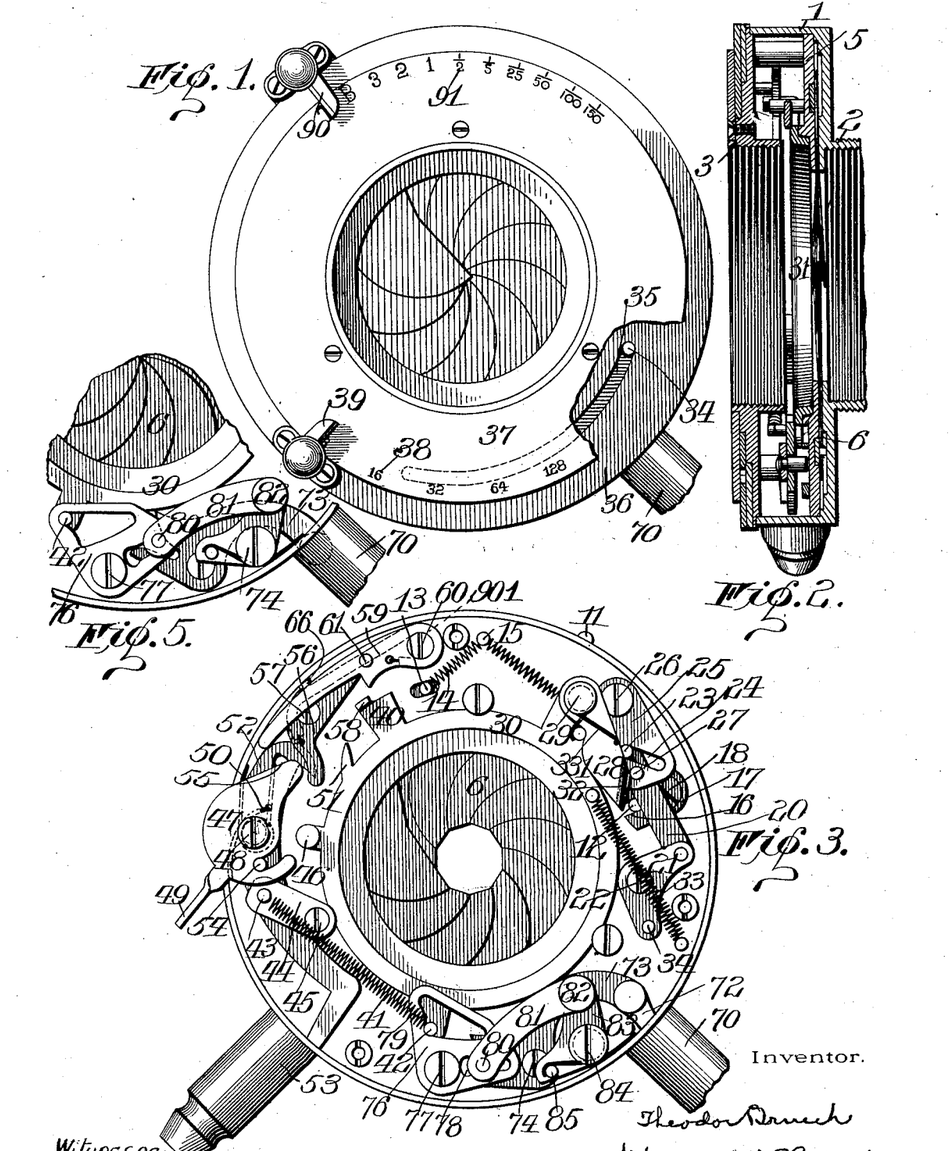
Figure 1 is a front elevation of a shutter constructed in accordance with my invention.
Fig. 2 is a vertical sectional view.
Fig. 3 is a view of the operating parts of the shutter when in normal position after making an instantaneous exposure at extreme speed, the shutter being open and the cover-plate and adjusting mechanism being removed.
Fig. 5 is a view of the retarding device at the completion of a timed exposure.
Figures 4A, 7:
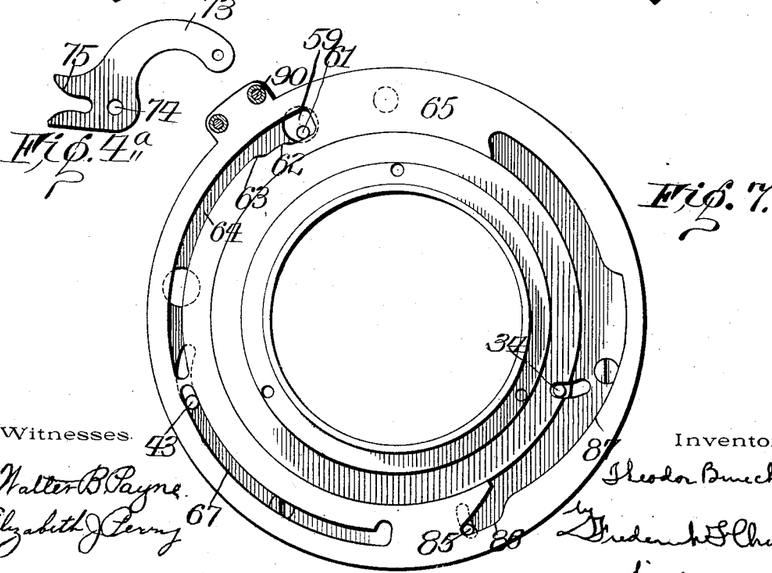
Figure 8:
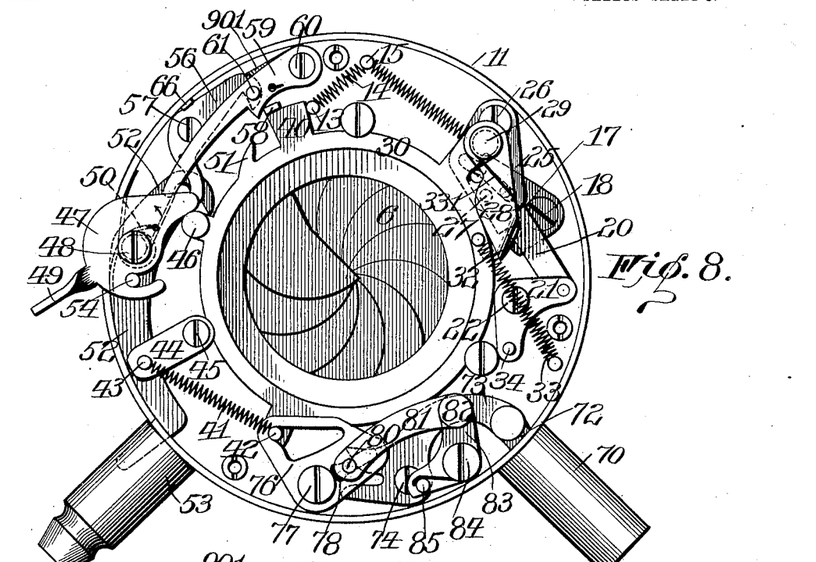
Fig. 8, a view similar to Fig. 3 with the operating parts arranged for a time exposure.
Figure 9:
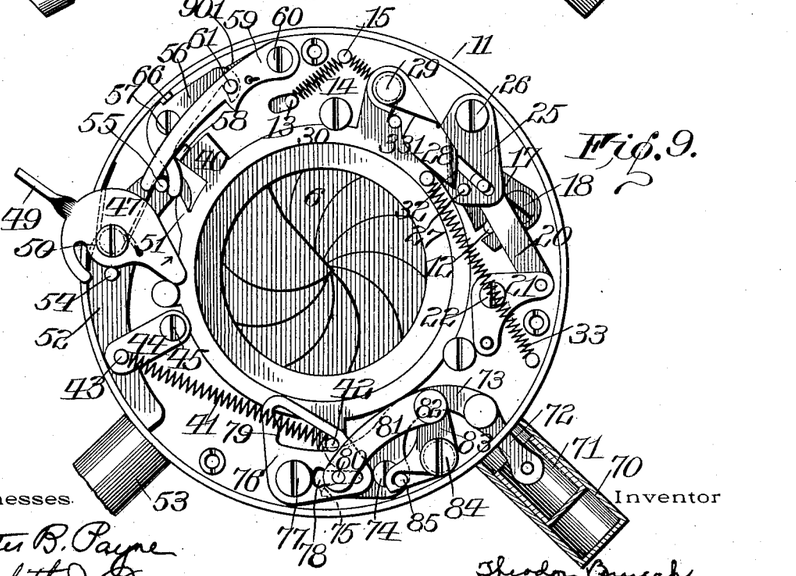
Fig. 9, a similar view showing the master member set ready for operation.
Figure 10:
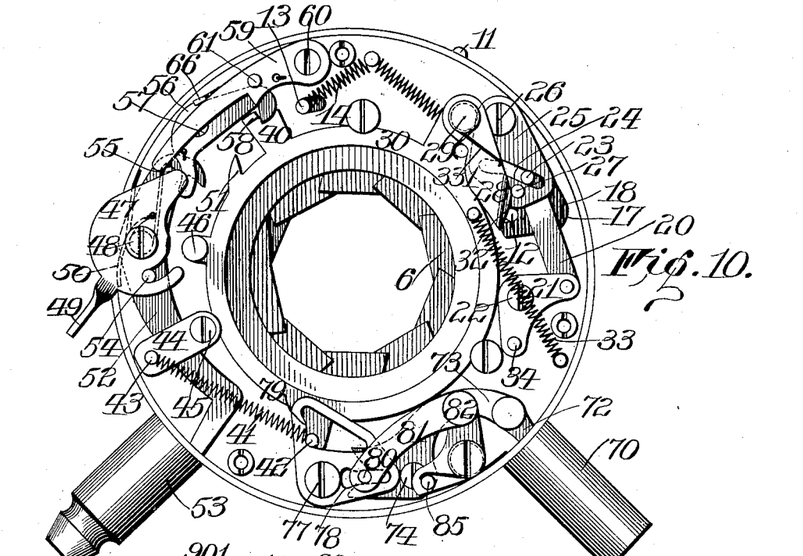
Figs. 10 and 11, similar views showing the master member arrested by the first and second stops, respectively, the shutter being open.
Figure 11:
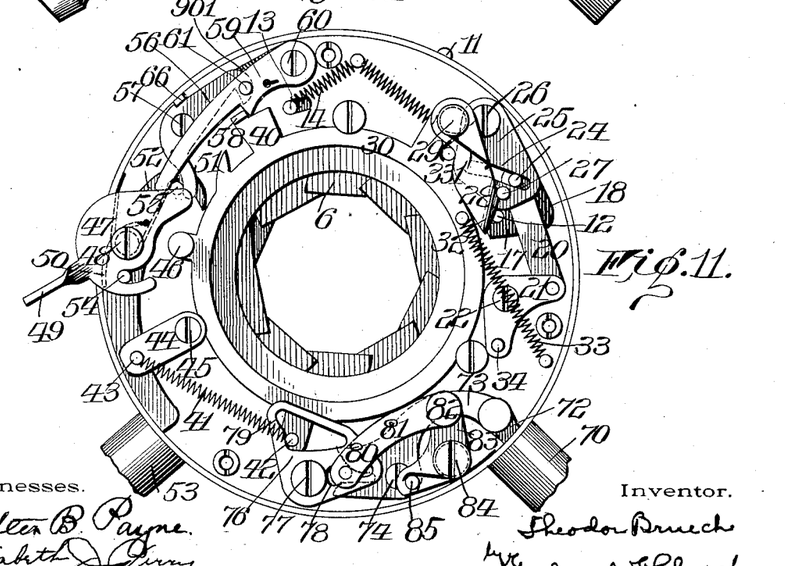
Figure 12:
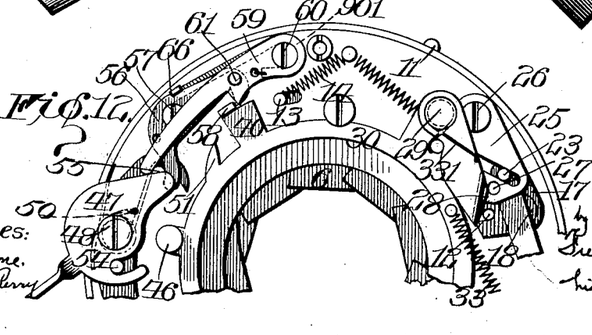
Fig. 12 is a view showing the master member being released to permit the closing of the shutter.
Figure 13:
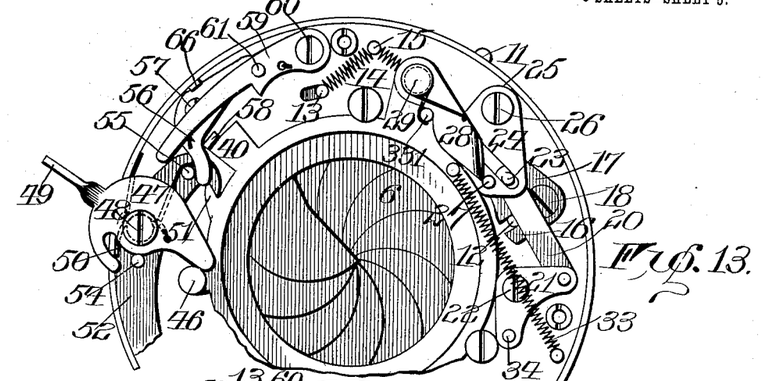
Figs. 13 and 14 are views showing the shutter set for bulb exposures and when being released to permit closing, respectively.
Figure 14:
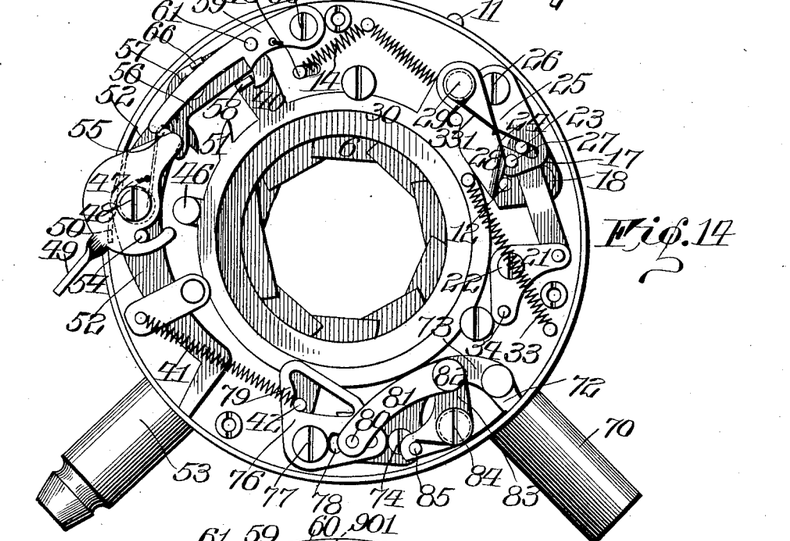

By reason of the latch connection between the master member and the shutter proper said member is moved freely in one direction against the tension of its operating-spring 33 without affecting the shutter, and it is while moving in the opposite direction that the blades are opened and closed or permitted to close, and for the purpose of normally holding the blades closed and preventing accidental movement the master member is provided with an extension 40, adapted to coöperate with the pin 13, as shown in Fig. 8. In addition to the spring 33 for operating the master member I provide another spring 41, connected at one end to the pin 42 on the master member and at the other to a pin 43 on a lever 44, pivoted at 45 to the support or septum 5, the outer end of this lever 43 being adapted to be adjusted from the position shown in Fig. 8 to that shown in Fig. 3, which adjustment gives additional power and serves to move the master member more rapidly for making very quick exposures, as will be explained. The master member is provided with a stud or projection 46, with which is adapted to engage the end of an operating and setting lever 47, pivoted at 48 and having an outer handle or engaging portion 49, said lever being operated to the position shown in Fig. 8 by a spring 50, and when operated to the position shown in Fig. 9 engaging the projection 46 and setting the master member against the tension of its spring or springs. 51 indicates a stop or projection on the master member, with which engages a hooked end of a catch or lever 52, having one end extended in position to be engaged by the piston of a pneumatic engine or pump of any preferred style and indicated by 53, by which it may be operated to release the master member. This lever 52 is also provided with a pin or projection 54, with which the lever 47 may engage, and also with a pin 55, arranged between the ends of the stops or catches controlling the movements of the master member and which for convenience will be termed "time-stops." 56 indicates one of the time-stops in the form of a lever pivoted at 57, the outer engaging end being adapted to project into engagement with a detaining stop or projection 58 on the master member. The other time-stop 59 is pivoted at 60 near its end and is provided with an engaging shoulder, also adapted to coöperate with the stop 58 on the master member; but its engaging shoulder is in rear of the engaging portion of the stop 56, considering the direction of movement of the master member to make an exposure. These stops are moved separately toward the projection on the master member by a spring 901 and are arranged relative to the projection 55 on the lever 52, so that they are operated by said lever and permitted to operate thereby in opposite directions alternately. The stop 59 is provided with a projection 61, which extends through an aperture in the front plate 3 and is adapted to be engaged by cams 62 and 63, arranged at the inner side and near the end of the concentric slot 64, formed in a controlling member or plate 65, rotatable on the front plate 3 of the casing and held in position by the cam-plate 36. The stop 56 is provided with a projection 66, with which the stop 59 is adapted to engage when moved outwardly far enough to hold both catches out of the path of movement of the projection 58 on the master member, and the cams 62 and 63 and the projection 61 on the stop 59 are so relatively arranged that when the plate 65 is adjusted in the position shown in Fig. 7 both stops are in position to engage successively with the master member, the shutter then being arranged for making time exposures, and upon the lever 47 being moved from the position shown in Fig. 8 to that in Fig. 9 the master member will be operated against the tension of its spring and retained by the catch 52 engaging the projection 51, the shutter remaining closed. By operating the catch 52 either by the pneumatic engine or by the movement of the lever 47 in the opposite direction from that required to set the master member the latter will be released and the catch or stop 56 projected into the path of the stop 58, the stop 59 being held out of engagement. When pressure upon the catch 52 is relieved, the pin 55 will move the catch 56 out of engagement with the stop 58, allowing the latter to engage with the shoulder of the stop 59, as shown in Fig. 11, and upon a second movement of the catch 52 the catch 59 will be moved out of engagement, allowing the master member to move to the position shown in Fig. 8, closing the shutter again. When it is desired to make a bulb exposure, the plate 65 is moved so that the cam 62 will hold the stop 59 out of the path of the projection 58, as shown in Figs. 13 and 14, and the operation of the catch 52 will release the master member and throw the catch 56 into the path of stop 58, holding the shutter open until the catch 52 is allowed to return, when it will disengage the stop 56 and allow the master member to complete its movement. When the setting-plate 65 is adjusted so that the cam 63 engages and moves the stop 59 outward to extreme position, as shown in Fig. 3, said stop will also, through the projection 66, hold the stop 56 out of the path of the master member, and when the catch 52 is released said member may move freely, causing the opening and closing of the shutter, and if a very rapid movement is desired the plate 65 is moved far enough to cause the end of the slot 67 therein to engage the pin 43 on the lever 44, giving additional tension to the spring 45, which actuates or assists in actuating the master member.

In order that the movement of the master member between the time when it opens the shutter and permits it to close may be varied for the purpose of enabling longer or shorter automatically-timed exposures to be made, I provide a retarding device, preferably in the form of a cylinder 70, in which operates a piston 71, and arrange adjustable connections between said piston and the master member, which are preferably controlled by the same controlling member or plate that controls the time-stops. In the present embodiment the piston 71 of the retarding device is connected by a link 72 with one end of the lever 73, pivoted at 74 in the casing and having its shorter end provided with a slot 75, flaring at its outer end, as shown. 76 indicates a lever or plate pivoted at 77 in the casing and being generally in the form of a bell-crank lever, having at one side a radially-extending slot 78 and on the other a slot or recess having a slightly-curved side 79, with which coöperates the pin 42 on the master member. The connection between the plate 76 and the lever 73 is formed by the pin 80, mounted on the end of a link 81, pivoted at 82 to one arm of the bell-crank lever 83, which in turn is pivoted in the casing at 84 and is provided with a pin or projection 85, extending outwardly and adapted to be engaged by the cam-surfaces 86 and 87 on the controlling-plate 65. The pin 85 is normally held pressed against the outer surface of the cam-slot in the plate 65 by a spring 88, which tends to move the link 81 longitudinally and keeps the pin 80 at the extreme outer wider end of the slot 75, practically disconnecting the levers 73 and 76 and permitting the free movement of the master member. When, however, the controlling plate or member is moved to draw the link 81 longitudinally, the connecting-pin 80 moves into the slots, and its position determines the leverage between the levers 73 and 76, causing the piston of the retarding device to be moved inward a greater distance when the master member is being set and permitting the retarding device to act upon the master member during the greater portion of its movement.

It will be noted that the lever 76 is always moved the same distance by the master member; but the leverage between it and the retarding device is varied by the adjustment of the pin 80.

The setting-plate 65 is provided at its upper portion with an index or pointer 90, coöperating with a scale 91 on the front plate 37, near its periphery, said scale containing the letters "T B" and the numerals "3, 2, 1," indicating seconds and larger numerals indicating fractions of seconds, and when the index coöperates with "T" the shutter is set for time exposure—that is, the retarding device is thrown out of operation and both the time-stops are in operative position. When set on the letter "B," one of the time-stops is out of coöperation with the master member and the other is free to engage it and the retarding device is disconnected, and when it coöperates with "3," indicating an exposure of three seconds, the retarding device is in operative connection with the master member, the leverage then being greatest against it, and so on down until when coöperating with "150" the time-stops and retarding devices are disconnected, and the spring 45 is under extreme tension.

The shutter as a whole is comparatively simple considering the results obtained, is largely constructed of sheet-metal stampings, and is found in practice to be admirably adapted for the purpose.

I claim as my invention—

1. The combination with a plurality of thin pivoted blades provided with elongated slots having flanges at their edges forming bearing-surfaces wider than the thickness of the blades, of an oscillatory actuating-ring having projections operating in the slots to move the blades on their pivots.

2. The combination with a plurality of thin blades pivoted at their ends and having elongated slots with flanges at the edges of the latter formed by extending the material thereof laterally and constituting bearing-surfaces, of an oscillatory actuating-ring provided with projections operating in the slots in the blades to move the blades on their pivots.

3. A blade for iris-diaphragm shutters composed of thin sheet material having a perforation and an elongated slot formed therein the material at the edges of the slot being turned laterally to form a broad wearing-surface at the inner sides of the slot.

4. The combination with the shutter proper embodying a plurality of overlapping blades connected for simultaneous operation to open and close an aperture and a spring for closing said leaves, of an oscillatory master member, a latch connection between said member and the blades to open and release them when moved in one direction and adjustable connections between the blades and master member for varying the amplitude of movement of the blades by the master member.

5. The combination with the shutter proper embodying a plurality of overlapping blades connected for simultaneous operation to open and close an aperture, and a spring for closing the blades, of an oscillatory master member, a lever, a latch connection between said lever and the master member for moving the lever in one direction and releasing it and an adjustable connection between said lever and the shutter-blades for varying the amplitude of movement of the latter.

6. The combination with the shutter proper embodying a plurality of overlapping blades connected for simultaneous operation, and a spring for normally holding the blades closed, of an oscillatory master member, a lever, a latch connection between said lever and the master member for moving the lever in one direction and releasing it, a second lever connected to the blades and a part coöperating with said levers and adjustable relatively to their pivots for varying the amplitude of movement of the blades.

7. The combination with the shutter proper embodying a series of overlapping blades, the oscillatory ring connected to the blades and a spring for operating said ring in one direction, of a spring-operated master member and a latch connection between the master member and ring whereby the ring may be moved by the master member against its spring and released and adjustable connections between the ring and master member for varying the amplitude of movement of the ring by the master member.

8. The combination with the shutter proper embodying a plurality of overlapping blades connected for simultaneous operation, and a spring for normally holding the blades closed, of an oscillatory master member, a lever having a slot therein, a latch connection between said lever and the master member for moving the lever in one direction and releasing it, a second slotted lever connected to the blades and connected projections coöperating with the slots in said levers and adjustable relatively to the pivots of the levers.

9. The combination with the shutter proper embodying a plurality of overlapping blades connected for simultaneous operation and a spring for normally holding the blades closed, of an oscillatory master member, a slotted lever, a latch connection between it and the master member, a second lever connected to the shutter-blades and having a slot and a freely-movable link having projections engaging the slots and adjustable relatively to the pivots of the levers.

10. The combination with the shutter proper embodying a plurality of overlapping blades connected for simultaneous operation and a spring for normally holding the blades closed, of an oscillatory master member, a lever having a slot, a latch connection between the lever and master member, a second lever having a slot and connected to the blades, a third lever a link pivoted thereto having projections engaging and adjustable in the slots of the two first-mentioned levers and means for adjusting the third lever on its pivot.

11. The combination with the shutter proper embodying a plurality of overlapping blades connected for simultaneous operation and a spring for closing them, of an oscillatory spring-operated master member having a latch connection with the blades and adjustable connections between the blades and latch for varying the amplitude of movement of the former by the latter.

12. The combination with the shutter proper embodying a plurality of overlapping blades connected for simultaneous operation and a spring for closing them, of the annular spring-operated master member, stops for controlling its movement in one direction, a latch connection between the master member and blades and adjustable connections arranged between the latch and blades for varying the amplitude of movement of the latter.

13. The combination with the shutter proper embodying a plurality of pivoted blades, an oscillatory ring having a slot-and-pin connection with the blades and a spring for rotating said ring in one direction, of an annular oscillatory spring-actuated master member, a latch mounted thereon and adjustable connections arranged between said latch and the ring for varying the amplitude of movement of the latter when the master member is actuated by its spring.

14. The combination with the casing having the central aperture, and the shutter proper therein, of the annular, oscillatory spring-operated master member extending around the casing-aperture, a latch connection between said member and the shutter proper, stops for controlling the movement of the member, a retarding device and adjustable connections between said retarding device and the master member for varying the force exerted by the former against the latter.

15. The combination with the casing having the aperture, the shutter proper arranged in the casing and the annular oscillatory master member surrounding the casing-aperture, of a retarding device for the master member embodying a pivoted lever, a second pivoted lever with which the master member coöperates and an adjustable connection between said levers for varying the connection between them.

16. In a shutter, the combination with the annular spring-operated master member connections between it and the shutter, and the projection on the member, of a pneumatic retarding device embodying a cylinder and piston, the lever connected to the piston having the slot, the lever having the aperture in which the projection on the master member operates, a third lever, a link connected thereto and a link on the lever having projections operating in the slots in the levers to vary the leverage between them.

17. In a shutter, the combination with the shutter proper, of the spring-operated oscillatory, annular master member having a projection thereon, a latch connection between said member and the shutter for operating the latter in one direction, a pivoted lever having an aperture, a shoulder adapted to be engaged by the projection on the master member and the slot, a pneumatic retarding device embodying a cylinder and piston, a slotted lever connected to the piston, a link having projections operating in the slots in the two levers, a third lever to which the link is pivotally connected and means for adjusting said lever on its pivot.

18. In a shutter, the combination with the shutter proper, an oscillatory, annular spring-operated master member coöperating with the shutter and having the projection thereon, of two spring-operated stops pivoted on separate centers and movable in the same direction to engage the projection on the master member successively, and a movable release member operating and permitting the operation of said stops alternately in opposite directions.

19. In a shutter, the combination with the oscillatory spring-operated master member, of the pivoted spring-operated stops 56 and 59 adapted to engage the master member, the former pivoted intermediate its length and the latter pivoted near one end and adapted to engage the former, means for adjusting the last-mentioned stop and a release member arranged between the ends of the stops for operating and permitting their operation in opposite directions relative to the master member.

20. In a shutter, the combination with the master member, of the spring-operated stop 56 pivoted at 57 and having the projection 66, the spring-operated stop 59 pivoted at 60 adapted to engage the projection 66 and having the pin 61 thereon, the release member having the projection arranged between the ends of the stops and a spring for operating said release member in one direction.

21. In a shutter, the combination with the shutter proper, the annular spring-operated master member having the projections 51 and 58 thereon, and a latch connection between the master member and the shutter proper, of the spring-operated catch 56 having the engaging portion on one side of the pivot and the operating portion at the other side, and the projection 66, the spring-operated catch 59 having the engaging portion and operating portion on the same side of its pivot, the release member 52 coöperating with the projection 51 on the master member and having the projection arranged between the operating ends of the catches and means for adjusting and controlling the movement of the catch 59.

22. In a photographic shutter, the combination with the shutter proper, the annular oscillatory master member and connections between them, said master member having the projections 42, 51 and 58, of the spring-operated stop 56 coöperating with the projection 58 on the master member and having the projection 66, the stop 59 also coöperating with the stop 58 and having the projection 61, the release member 52 coöperating with the projection 51 on the master member and also with stops 56 and 59, a retarding device adjustable connections between it and the master member, and the movable controlling member having cam-surfaces for coöperating with the stop 59 and a surface coöperating with the connections between the master member and the retarding device to vary the relations between the latter.

23. In a photographic shutter, the combination with a casing having the central aperture, the shutter proper and the annular oscillatory master member connected with the shutter, time-stops for coöperating with the master member, a retarding device and adjustable connections between it and the master member, of the annular controlling-plate having the cam-surfaces coöperating with the time-stops and the cam-surface for varying and controlling the connection with the retarding device.

THEODOR BRUECK.

Witnesses:
 WALTER B. PAYNE,
 HENRY W. HALL.